United States Patent
Bäck et al.

(10) Patent No.: US 6,968,196 B1
(45) Date of Patent: Nov. 22, 2005

(54) LOCATION AREA UPDATE IN A COMMUNICATION SYSTEM

(75) Inventors: Juha Bäck, Helsinki (FI); Juha Kuisma, Hyvinkää (FI)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 10/149,269

(22) PCT Filed: Nov. 27, 2000

(86) PCT No.: PCT/EP00/11912

§ 371 (c)(1),
(2), (4) Date: Nov. 20, 2002

(87) PCT Pub. No.: WO01/43477

PCT Pub. Date: Jun. 14, 2001

(30) Foreign Application Priority Data

Dec. 6, 1999 (GB) .................................... 9928811

(51) Int. Cl.[7] .............................................. H04Q 7/20
(52) U.S. Cl. ................ 455/456.5; 455/458; 455/435.1; 455/524; 455/525
(58) Field of Search .................... 455/458, 445, 455/433, 435.1, 435.3, 426.1, 456.5

(56) References Cited

U.S. PATENT DOCUMENTS

| | | | |
|---|---|---|---|
| 5,369,681 A | * | 11/1994 | Boudreau et al. ........ 455/456.1 |
| 5,369,684 A | * | 11/1994 | Buhl et al. ................ 455/432.1 |
| 5,613,199 A | * | 3/1997 | Yahagi ...................... 455/426.1 |
| 5,713,073 A | * | 1/1998 | Warsta ........................ 455/524 |
| 5,875,400 A | * | 2/1999 | Madhavapeddy et al. ... 455/458 |
| 5,924,042 A | * | 7/1999 | Sakamoto et al. .......... 455/458 |
| 5,949,774 A | * | 9/1999 | Seekins et al. .............. 370/331 |
| 6,058,308 A | * | 5/2000 | Kallin et al. ............. 455/432.3 |
| 6,081,723 A | * | 6/2000 | Mademann ............... 455/456.1 |
| 6,185,421 B1 | * | 2/2001 | Alperovich et al. ......... 455/433 |
| 6,363,255 B1 | * | 3/2002 | Kuwahara ................ 455/456.5 |
| 6,370,378 B1 | * | 4/2002 | Yahagi ........................ 455/433 |
| 6,549,775 B2 | * | 4/2003 | Ushiki et al. ............. 455/432.1 |

OTHER PUBLICATIONS

"Location Management Strategies for Cellular Mobile Networks", N.Kruijt et al, *Electronics & Communication Engineering Journal*, Apr. 1998, pp. 64-72.

* cited by examiner

*Primary Examiner*—William Trost
*Assistant Examiner*—Sharad Rampuria

(57) ABSTRACT

The present invention relates to a method and a controller for a radio communication system. The system comprises a plurality of location areas. The controller serves said location areas and mobile stations within said location areas. In accordance with the method a request for initiation of location area information update proceedings is received at the controller. The controller then verifies whether the mobile station is subjected to a simultaneous paging procedure. If a simultaneous paging procedure is detected, the location area information update proceedings are interrupted and an acknowledgement message is generated and transmitted, said message informing the mobile station that the location area information update proceedings are completed.

12 Claims, 3 Drawing Sheets

LOCATION AREA UPDATE IN A COMMUNICATION SYSTEM

FIELD OF THE INVENTION

The present invention relates to location update procedures in a communication system and in particular, but not exclusively, to location update procedures in a cellular radio communication network.

BACKGROUND OF THE INVENTION

A communication network is a cellular radio network consisting of cells. In most cases the cell can be defined as a certain area covered by one or several base transceiver stations (BTS) serving mobile stations (MS) or similar user equipment (UE) via a radio interface and possibly connected to a base station controller (BSC) or to a base station subsystem (BSS). Several cells cover a larger area, and typically form a radio coverage area referred to as a location area (LA) or as a routing area (RA). It is noted that the size of the location area or routing area depends on the system and circumstances, and may equal to several cells or just to one cell.

A feature of the cellular system is that it provides mobility for the mobile stations. In other words, the mobile stations are enabled to move from a location area to another location area. The mobile stations may even roam from a network to another network that is compatible with the standard the given mobile station is adapted to. A feature of the mobility function is that it records location area information concerning the location of a particular mobile station in a given moment of time. A cellular communications system typically comprises a location register or several location registers for the location management purposes. The location management function typically operates such that whenever a mobile station enters a new location or routing area, the location area information associated with the mobile station is updated at an associated location register or several registers.

For example, in a circuit switched GSM (Global System for Mobile) network a controller function is provided by means of a mobile switching center (MSC). The location information of a mobile station is maintained centrally by a home location register (HLR), wherein the mobile station is permanently registered at the home location register. At the same time the mobile station is registered locally by a visitor location register (VLR). A VLR is typically implemented in connection with the MSC, but the system handles the MSC and the VLR as separate logical entities. The mobile station will be registered only temporarily to the visitor location register. Each of the mobile switching centers (MSC) is typically provided with a visitor location register. The VLR at which the mobile station is temporarily registered at a given moment is the VLR of the MSC that is currently serving the mobile station. The HLR may be a stand alone element in the network or the HLR may be integrated with another network element, such as located within one of the switching centers provided in the network. Even though it is not necessary, the arrangement is typically such that the HLR knows the VLR at which the MS is currently registered and the VLR knows then the actual location area (LA) within which the MS is currently located.

Information of the location area is needed for various purposes. For example, when somebody tries to establish a call terminating at a mobile station or send a short text message to the mobile station, the communication system has to be aware of the location area so that it may route the call related signaling and the call into a correct location area and page the mobile station in that area. A location area may be identified by a location area identifier (LAI) that can be found from the visitor location register. The LAI is typically registered also at the mobile station, for example, at a subscriber identity module (SIM) of the mobile station. If the mobile station moves from one location area to another, the location area identifier is updated accordingly at the VLR and the SIM as soon as possible. If the mobile station moves from the service area of one MSC to the service area of another MSC, the visitor location register (VLR), the subscriber identity module (SIM) and the home location register (HLR) are all updated accordingly. The update messages may be transmitted in common broadcasting channels. The user of the mobile station is usually not aware of the update procedures and no actions are required from him to initiate a location update procedure.

The location update is typically initiated by the mobile station. According to a possibility the mobile station listens the common broadcasting channel of the cell so that the mobile station may receive a location area identifier (LAI) of the current location area via said broadcasting channel. Since the mobile station may be simultaneously within the radio coverage areas of several cells (and thus several location areas), the mobile station typically listens the broadcasting channel of a cell with the strongest or best quality radio signal. After the mobile station has selected a cell it will listen, it may check whether the received LAI matches with the LAI that is currently stored at the mobile station. If the two LAIs do not match, the mobile station request for a location update from the serving switching center. The location update procedure may also be initiated periodically. In addition, an international mobile subscriber (IMSI) attach/detach may also trigger the update procedure. It is possible that all these events may initiate the update, and thus the location update will occur relatively often.

The common broadcasting channel, such as a common control channel (CCCH), typically comprises several logical channels. One of the logical channels may be used for paging signaling and another for location update signaling. When a mobile station is "on" or in an active state, the mobile station continuously monitors the logical paging channel to detect if it is paged, i.e. if anybody wishes to establish a connection with it. If the mobile station detects that it is paged, it will respond so that a communication connection may be established between the calling party and the mobile station by the communications system.

The mobile stations are typically arranged such that they may be in a simultaneous signaling communication via one logical channel only. Therefore, any operations requiring simultaneous communication through more than one logical channel may cause problems. For example, a mobile station cannot listen to the paging channel during an ongoing location area update procedure, and may return to the monitoring of the paging channel only after the update procedure has been finished. The update procedure may take a relatively long time. Typically the update procedure may take seconds, such as 3 to 10 seconds, depending on the procedures that are required to be performed during the update. The possible procedures performed during a location area update may include procedures such as identification of the mobile station (e.g., fetching an IMSI from the mobile station), authentication, ciphering, temporary mobile subscriber identity (TMSI) reallocation, international mobile station equipment identity (IMEI) request and processing of mobility management (MM) information.

If a mobile station is paged during the update procedure, the paging may fail. Depending on the application, the caller may receive a 'reserved' tone, may become disconnected or may be connected to a voice mail of the called party after a paging timer at the mobile switching center expires, or some other procedure may follow. The paging is accomplished based on location area information stored at the local i.e. visited register, and thus the paging may also fail if the information stored at the visited register is changed during the paging procedure. The paging may have been initiated based on the "old" location area information retrieved from the register just before the update and while the mobile station may have already started to listen a "new", different control channel.

The inventors have found that the significance of the above discussed problems may increase with the modern cellular networks, as the size of the location areas in the modern networks has been reduced. Thus the number of the location areas has increased. The size of the location areas is also believed to become even smaller in the future applications. This will lead to a situation in which the mobile stations will more often move from one location area to another. Thus it is likely that more location updates will be accomplished than before. Consequently, this means that the paging and location update procedures may be more often interrupted by each other in connection establishment procedures where the connection should terminate at a mobile station.

SUMMARY OF THE INVENTION

It is the aim of the embodiments of the present invention to address one or several of the above problems.

According to one aspect of the present invention, there is provided a method in a communication system providing radio communications for mobile stations and comprising a plurality of location areas and a controller functionality for serving at least two of said location areas and mobile stations within said at least two location areas, the method comprising:
  receiving at the controller functionality a request for initiation of location area information update procedures, the location area information being associated with a mobile station within the service area of the controller functionality;
  verifying at the controller functionality whether the mobile station is subjected to a simultaneous paging procedure; and
  if a simultaneous paging procedure is detected, interrupting the location area information update procedure and transmitting an acknowledgement message informing the mobile station that the location area information update procedure is completed.

According to another aspect of the present invention there is provided a controller in a communication system for serving at least two location areas of the system and mobile stations within said at least two location areas, the controller comprising:
  a first resource for receiving a request for initiation of location area information update procedure, the location area information being associated with a mobile station within the service area of the controller, wherein the resource is arranged to verify whether the mobile station is subjected to a simultaneous paging procedure; and
  a second resource for interrupting the update and for transmitting an acknowledgement message to the mobile station informing the mobile station that the update procedure is completed in the even that a simultaneous paging procedure was detected.

The embodiments of the invention provide several advantages. The paging success rate may be improved. The number of such call attempts to mobile stations or any other transactions that are intended to terminate at the mobile station (e.g. short messages, supplementary services) that are disturbed by location area updates may be reduced. The capacity of the controller element may be used more efficiently since it may be possible to reduce the number of unsuccessful paging attempts due to the improved paging success rate.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
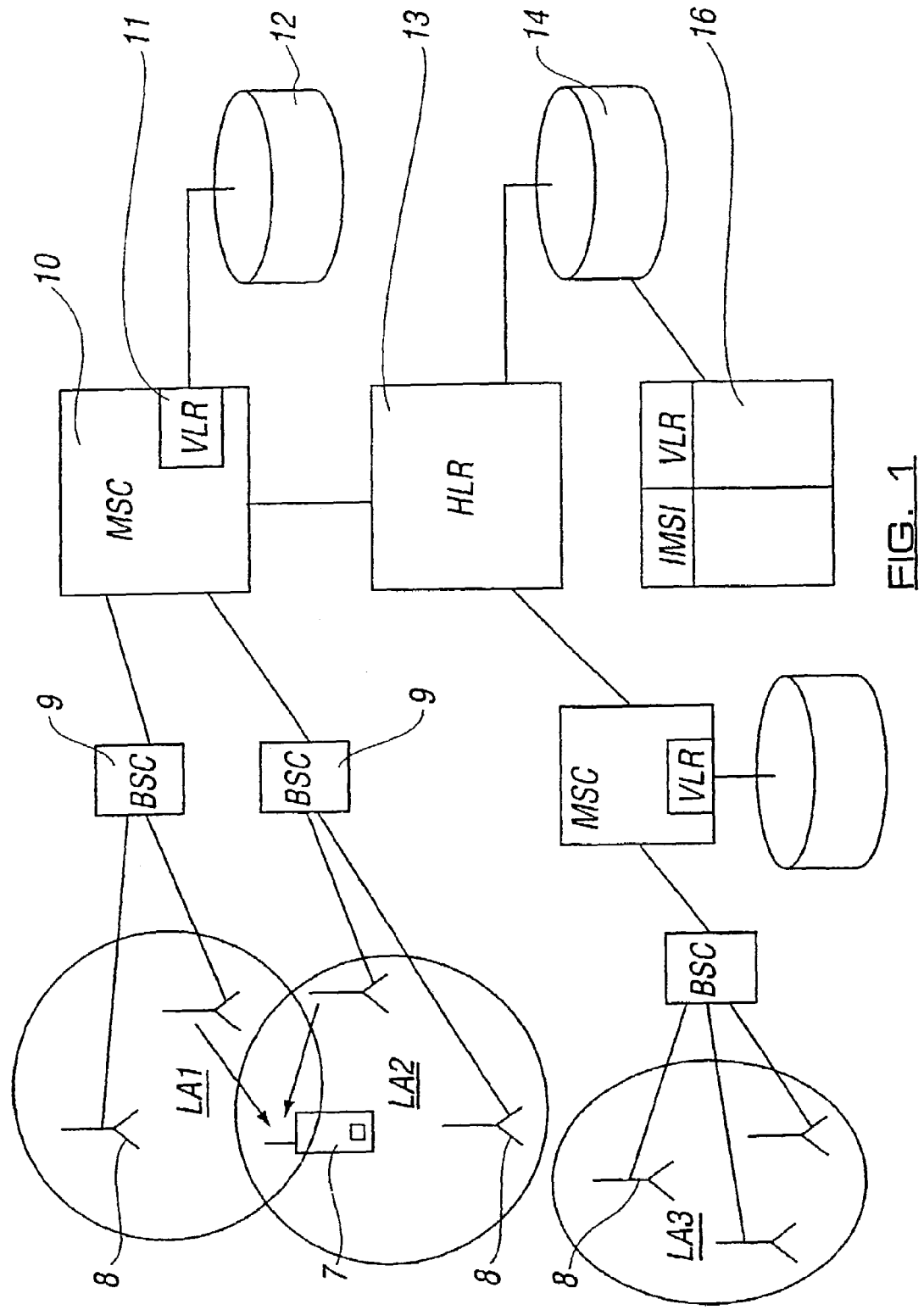
FIG. 1 shows one embodiment of the present invention.

Reference is now made to FIG. 1 which shows an embodiment of the present invention. It is noted that even though the exemplifying telecommunications system shown and described in more detail uses the terminology of a circuit switched GSM (Global System for Mobile communications) public land mobile network (PLMN), embodiments of the present invention can be analogously used in any system providing communication services for a station that is capable of moving between at least two location areas.

Three location areas (LA) of the communications system are illustrated in FIG. 1. Each of the location areas LA1, LA2 and LA3 comprises a number of respective base transceiver stations (BTS) 8 of the respective cells (not shown). Several cells may be grouped to be served by a base station controller (BSC) 9 such that one location area may comprise more than one cell. However, the location area may also comprise only one cell. It is noted that a BTS may cover several cells, e.g. in arrangement using sectored base stations. Each base transceiver station (BTS) is arranged to transmit signals to and receive signals from the mobile station (MS) 7 in the cell. Likewise, the mobile station 7 is able to transmit signals to and receive signals from the respective base transceiver stations. The mobile station 7 accomplishes this via wireless communication with the base stations. Typically a number of mobile stations will be in communication with each base station although only one mobile station is shown in FIG. 1 for clarity. It should also be appreciated that the number of base stations in one location area may differ from that shown in FIG. 1. Even though a cell belongs to a location area, in practice the location areas typically overlap with each other due to overlapping radio coverage areas of adjacent cells.

Each of the base stations is typically controlled by a respective controller entity. In a cellular communication system a network controller typically controls the associated location areas, either directly or via the base station controller or similar subsystem. It is noted that typically more than two network controllers are provided in a network.

In the exemplifying GSM system the base stations 8 are typically connected via the base station controller BSC 9 (or a radio network controller; RNC) to a Mobile Switching Center (MSC) 10. In some arrangements the base station controller BSC controlling one or several base stations between the network controller 10 and the base stations 8 can be omitted. Even though not shown, each of the MSCs may be connected to other elements or parts of the telecommunications system, such as to a Public Switched Telephone Network (PSTN), via a suitable linking or gateway apparatus, such as Gateway Mobile Switching Center (GMSC).

The mobile station 7 is able to move from one location area to another location area, e.g. from LA1 to LA2. The location area identifier (LAI) associated with the mobile station 7 may thus vary in time. To ensure a proper operation of the system, location area update procedures are provided so that all necessary information will become available for the network entities that are involved in the provision of radio communication services for a mobile transceiver station.

In order to be able to control the mobile station 7 that may communicate with different base stations 8 of the mobile telecommunications network the mobile station 7 is registered permanently to a particular home register and temporarily to a visited register. In the example of FIG. 1 the mobile telecommunications network comprises a stand-alone home location register (HLR) 13 provided with an appropriate database 14. A visitor location register (VLR) 11 of FIG. 1 is comprised in the MSC 10 and is provided with a database 12. It is, however, noted that the VLR may also be implemented elsewhere in the system. The mobile station 7 within the location area LA1 is registered permanently at the HLR 13 of the mobile telecommunications network and temporarily at the VLR 11 serving the visited location area. The home and visitor location registers can communicate with each other e.g. over a MAP (Mobile Application Part) interface or any other suitable interface. It is noted that a mobile telecommunications network may include several home location registers and that instead of being a stand-alone element, the home location register may be included in one of the network elements, such as one of the controllers.

The arrangement is typically such that the database 14 of the HLR 13 centrally and permanently stores information associated with the particular MS 7. The information includes an indication of the VLR 11 at which the mobile station 7 is temporarily registered. As disclosed, the database 14 may include a table 16 mapping an international mobile subscriber identity (IMSI) with the identity of the current particular VLR or any other suitable registering facility. Since the information is continuously updated, the register, such as the table 16, enables the HLR 13 to provide information of the VLR at which the mobile station is currently registered.

A database 12 of the VLR 11 stores more accurate information relating to the current location area of the mobile station 7. As is shown more accurately by FIG. 2, the database 12 may contain an information table 1 which associates an IMSI code, a possible TMSI (temporary mobile subscriber identity) code and the current location area identifier (LAI) with each other.

The TMSI code is a temporary identity allocated to the mobile station, and may be used, for example, for security reasons in situations where it is not desirable to transmit the IMSI code over the radio interface between the mobile and base stations. The TMSI code is also typically shorter that the IMSI code, and thus the use thereof may save signaling resources. The TMSI may be allocated by the VLR. Typically the TMSI associates with the service area of the allocating VLR only. The TMSI is used only in the communication between the MSC and the mobile station. The mobile station is identified elsewhere in the communications system by the IMSI code.

Before explaining in more detail the purpose and function of the operational principles of an embodiment of the invention, a brief explanation of "conventional" location update and paging procedures will be given first.

Figure 2:
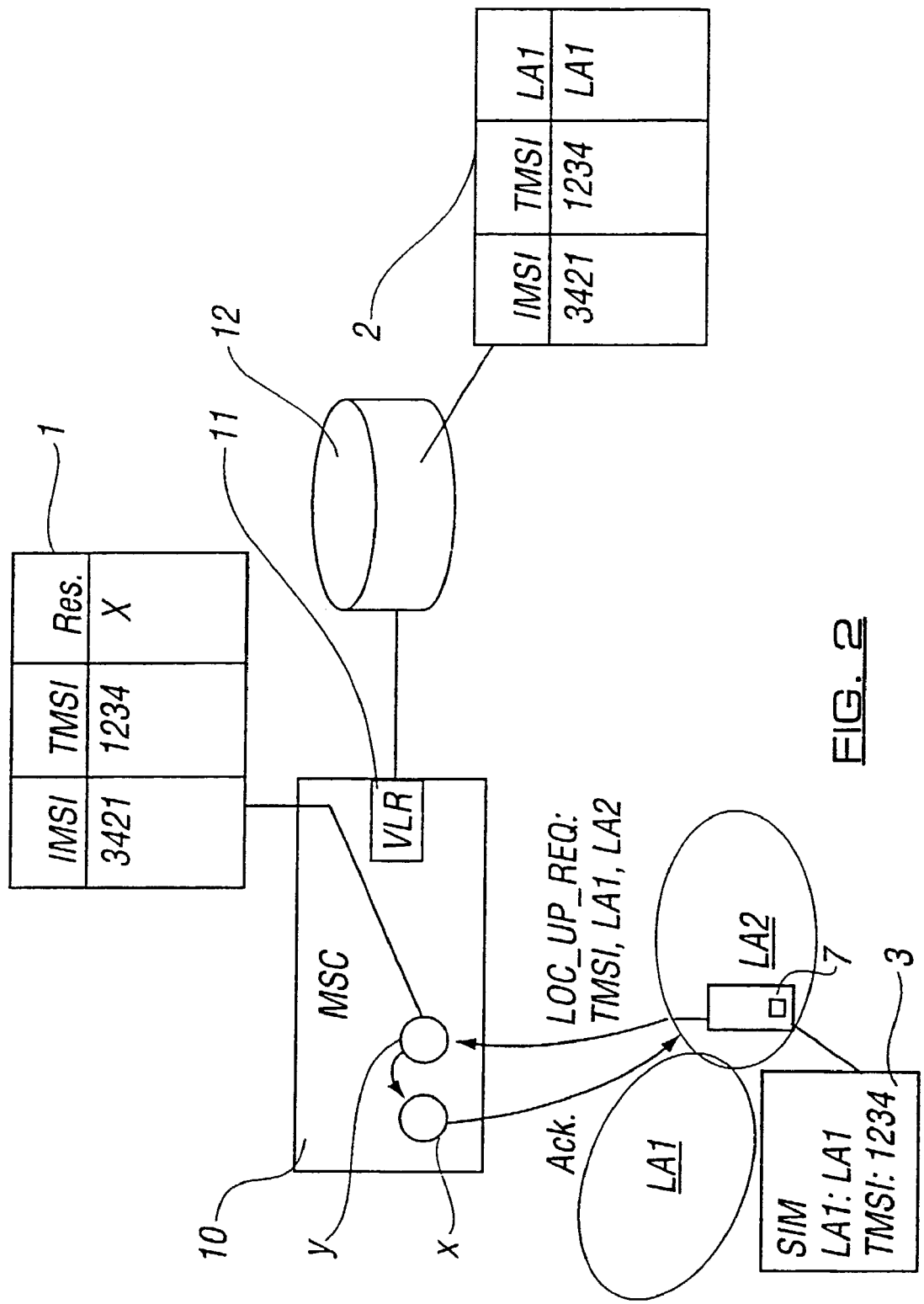
FIG. 2 shows in more detail the embodiment of FIG. 1.

With reference to FIGS. 1 and 2, lets assume that the mobile station 7 has moved from LA1 to LA2. The mobile station 7 initiates a location update procedure by sending a location update request message to the controller, i.e. the MSC 10. The message includes the "old" location area identifier (i.e. LA1) and the IMSI (or TMSI) code of the mobile station. The BSC 9 will add the "new" location area identifier (i.e. LA2) to the message, whereafter the message is forwarded to the MSC 10. The location update request message will be processed by the MSC and the location area information at the table 2 of the VLR database 12 is updated accordingly. After the information stored at the VLR is successfully updated, an location update acknowledgement message may be sent as a response to the mobile station 7, said message including the new location area identifier (i.e. LA2). The mobile station receives the "new" identifier and updates the location area information in its memory means. In FIG. 2 this would mean update of the LAI from LA1 to LA2 at the SIM card 3 of the mobile station 7 (i.e. LAI=LA1 is updated to LAI=LA2).

Paging of the mobile station 7 is initiated when somebody initiates a set-up procedure for a connection terminating at the mobile station 7, typically by selecting the appropriate telephone number. The communication system will process the call set-up procedure, and based on the information stored at the HLR 13 the call set-up signaling will eventually enter the MSC 10. At this stage a location area identifier indicating the current location area of the mobile station is retrieved from the database of the VLR 11. The paging of the mobile station 7 can then be initiated through the base stations serving the indicated location area. The mobile station 7 listens to the broadcasting control channel of the location area. When it detects that it has been paged, it responds through the control channel. After the mobile station is found the call connection establishment may continue and a call connection may be established.

In case the location update and the paging procedure do not occur simultaneously, these two procedures may operate in a normal manner. However, as discussed above, the mobile stations are typically not capable of simultaneously handling both the paging and the location update procedures. For example, it is possible that the location update procedure is initiated by the mobile station 7 before the call set-up signaling enters the MSC 10 or before the paging is initiated by the base stations. In this situation the mobile station may have sent the location update request message before the paging has started but also such that the update cannot be handled and completed before the paging should start. The logical control channel would be reserved for the update signaling, and the call attempt would fail.

The call attempt failure may be avoided by preventing or canceling the update signaling or by interrupting the update signaling for the duration of the call connection. The incoming location update request may be associated at the MSC 10 with a resource or object X that is or will be handling the paging procedure. The resource X designates here an entity or instance of the MSC 10 that handles the paging operation of the mobile station 7. The resource may be a program object that is allocated and started to act as a counterpart of a mobile station specific signaling. The program object may be run in a processor entity.

Figure 3:
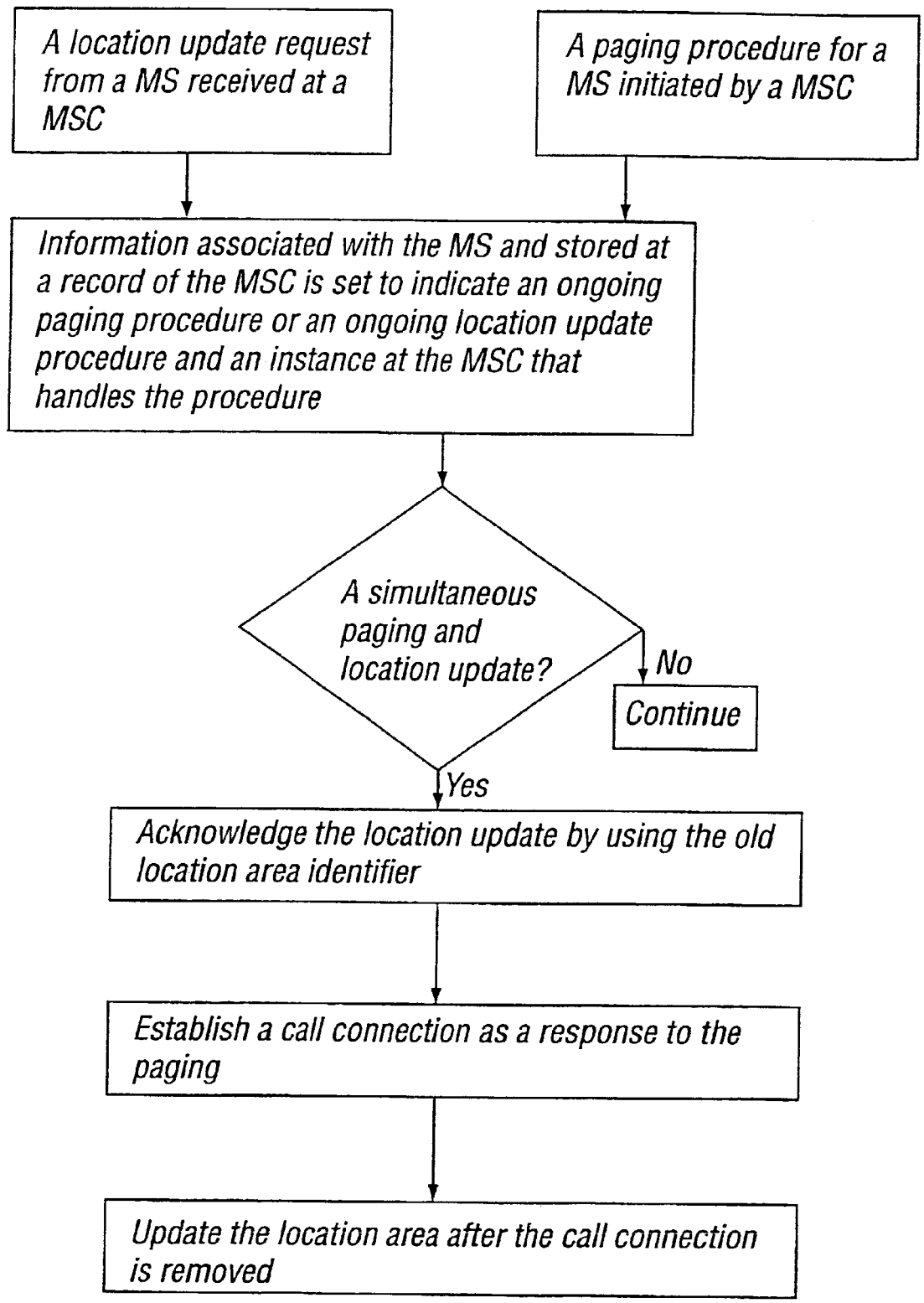
FIG. 3 is a flowchart illustrating the operation of one embodiment of the present invention.

The embodiments described below with reference to all FIGS. 1 to 3 provide improved operation in situations where a location update would interfere with the paging of the mobile station 7. The resource X is informed of the location update and may then act for a moment as the location area update request would have been accepted and completed. More particularly, the resource X may send immediately an acknowledgement message (Ack) that contains the old location area identifier (LA1 in FIGS. 1 and 2) back to the mobile station. This saves time compared to the conventional procedure in which the logical channel may be reserved for the update until the database of the VLR 11 is updated and the new location area identifier (LA2) is sent as an acknowledgement to the mobile station after the update procedure is completed at the MSC. Instead of this, the mobile station receives the old location area identifier, and no updates of the location area information at the SIM 3 is required. After a positive acknowledgment of the location update the mobile station stays at the "old" control channel (e.g., in wait for a network control state).

This channel may then be used to establish a communications transaction that terminates at the mobile station 7. The information will remain unchanged at the VLR 11 of the MSC 10, as the location update request will not be processed to the extent that the update of the location information at the VLR entity would occur.

According to the embodiment of FIG. 2 the MSC entity comprises a further register. In FIG. 2 the register is implemented by means of a table 1. The register contains specific information associating with the mobile station 7. When the MSC 10 initiates the paging of the mobile station 7, an indication of the paging resource X will be added into the table 1. When a location update request is received by a location update handling resource Y, the table 1 is checked by the resource Y. When the resource Y detects that the mobile station 7 is indeed paged (or that the station is to be paged in the near future) by resource X, it may transfer the update transaction handling to the paging resource X. The mobile station terminated signaling may then be performed in the logical control channel that was originally reserved for the location update signaling. The location update request message that is received during the paging procedure may then be handled as a normal paging response message, i.e. an indication that the mobile station 7 was "found" and has responded to the paging signaling. Thus it may not be necessary to send any paging towards the mobile station, as it is already found. A location update acknowledgement message together with the old LAI is sent to the mobile station in order to have similar information at the VLR database and the record of the mobile station.

In other words, the paging signaling may have a higher priority than the location area update signaling. The paging signaling may replace the location area signaling on the control channel. The location update acknowledgement message is preferably returned immediately to the mobile station. The acknowledgement message may contain the old LAI to ensure that corresponding information will be stored both at the VLR and the mobile station.

As shown by FIG. 3, the location area update may be completed later, after the call connection is released. The update is preferably initiated by the mobile station in a normal manner. As long as the connection is active the mobile station believes that it still remains within the old location area, i.e. in LA1. It is noted here that this does not have disadvantageous influence to the normal connection processing and handling, since the location area information is typically used only for paging purposes. During an ongoing connection no paging procedure is required towards an active mobile station, although it is possible to offer some other transactions to the mobile station, such as a "waiting call" service, short message service and so on.

It should be appreciated that while embodiments of the present invention have been described in relation to mobile stations, embodiments of the present invention are applicable to any other suitable type of user equipment.

The embodiment of the present invention has been described in the context of a GSM system. This invention is also applicable to any other access techniques. For example, in a general packet radio service (GPRS), that is an example of a packet switched cellular radio network, the service area of a GPRS may be controlled by means of a serving GPRS support node (SGSN). The SGSN corresponds substantially to the MSC of the GSM, but is implemented to provide packet switched communication services. Although the packet switched networks may have location register functionality of their own, the GPRS may utilise the HLRs and VLRs of the GSM system. Other systems, such as the proposed CDMA (Code Division Multiple Access) or UMTS (Universal Mobile Telecommunications System) are also provided with appropriate controller and location management functions. It should also be appreciated that base stations can sometimes be referred to as node B.

The embodiments of the invention were discussed above with reference to the control channel interface between the mobile station and the network controller. Embodiments of the present invention can be applicable to other network elements where applicable.

It is also noted herein that while the above describes exemplifying embodiments of the invention, there are several variations and modifications which may be made to the disclosed solution without departing from the scope of the present invention as defined in the appended claims.

What is claimed is:

1. A method in a communication system providing radio communications for mobile stations and comprising a plurality of location areas and a controller functionality for serving at least two of said location areas and mobile stations within said at least two location areas, the method comprising:

receiving at the controller functionality a request for initiation of a location area information update procedure, the location area information being associated with a mobile station within a service area of the controller functionality;

verifying at the controller functionality whether the mobile station is subjected to a simultaneous paging procedure; and if a simultaneous paging procedure is detected, interrupting the location area information update proceedings and transmitting an acknowledgement message informing the mobile station that the location area information update procedure is completed.

2. A method according to claim 1, wherein, if a simultaneous paging procedure is detected and the request for the location area information update procedure requests for a location area update from an old location area to a new location area, the request containing an identifier of the old location area and an identifier of the new location area, then the controller functionality transmits the old location area identifier in the acknowledgement message as the current location area identifier.

3. A method according to claim 1, wherein the location area information is stored at a visitor location register entity.

4. A method according to claim 1, wherein the location area information update procedure is handled by a first resource of the controller functionality and the paging procedure is handled by a second resource of the controller functionality, and the location area information update procedure is transferred from the first resource to the second resource after the detection of a simultaneous paging procedure by the second resource.

5. A method according to claim 1, wherein an indication of simultaneous paging procedure is stored in a register identifying of the mobile station and the resource handling the paging procedure.

6. A method according to claim 1, wherein the request from the mobile station for the location area information update procedure is processed as a response to the paging of the mobile station.

7. A method according to claim 1, wherein signaling of the paging procedure will replace signaling of the location information update procedure on a logical control channel.

8. A controller in a communication system for serving at least two location areas of the system and mobile stations within said at least two location areas, the controller comprising:
  a first resource for receiving a request for initiation of location area information update procedure, the location area information associated with a mobile station within a service area of the controller, wherein the first resource is arranged to detect whether the mobile station is subjected to a simultaneous paging procedure; and
  a second resource for interrupting the update procedure and for transmitting an acknowledgement message to the mobile station informing the mobile station that the update procedure is completed in the event that a simultaneous paging procedure was detected.

9. A controller according to claim 8, wherein the request for the location area information update procedure contains a first identifier of a first location area and a second identifier of a second location area, and wherein the controller is arranged to transmit the first location area identifier in the acknowledgement message as the current location area identifier instead of the second location area identifier indicated by the request.

10. A controller according to claim 8, wherein the location area information update procedure is handled by the first resource of the controller and the paging procedure is handled by the second resource of the controller, and the controller switches the location area information update procedure from the first resource to the second resource after the detection of a simultaneous paging procedure by the second resource.

11. A controller according to claim 8, wherein the controller comprises a record containing an indication of a simultaneous paging procedure.

12. A controller according to claim 11, wherein the record is a table associating an identification of the mobile station with the second resource handling the paging procedure for the mobile station.

\* \* \* \* \*